United States Patent [19]

Tappeiner et al.

[11] 4,319,224

[45] Mar. 9, 1982

[54] POWERLINE CARRIER CONTROL SYSTEM WITH POWERLINE CURRENT COMPENSATION

[75] Inventors: Hermann Tappeiner; Ernst-Robert Paessler, both of Erlangen; Kurt Smutny, Neunkirchen; Karl-Heinz Krügel, Erlangen, all of Fed. Rep. of Germany

[73] Assignee: Siemens Aktiengesellschaft, Munich, Fed. Rep. of Germany

[21] Appl. No.: 40,461

[22] Filed: May 18, 1979

[30] Foreign Application Priority Data

Jun. 8, 1978 [DE] Fed. Rep. of Germany ....... 2825240

[51] Int. Cl.³ .............................................. H04B 3/54
[52] U.S. Cl. .......................... 340/310 R; 340/825.62
[58] Field of Search ........ 340/310 R, 310 A, 310 CP, 340/150, 151, 167 A, 167 R, 152 R, 152 T, 538; 361/64, 68; 375/22, 24, 36, 71, 74; 455/66, 46; 333/24 R, 25

[56] References Cited

U.S. PATENT DOCUMENTS

| | | | |
|---|---|---|---|
| 2,192,061 | 2/1940 | Woodworth | 340/310 R |
| 2,385,673 | 9/1945 | Woodworth | 340/310 R |
| 3,909,821 | 9/1975 | Jagoda | 340/310 R |
| 4,021,797 | 5/1977 | Hofmeister | 340/310 A |

FOREIGN PATENT DOCUMENTS 2304734 8/1974 Fed. Rep. of Germany .

OTHER PUBLICATIONS

*Elekrizitatswirtschaft*, vol. 70, 1971, No. 9, pp. 237–241.
*VDI-Zeitschrift*, vol. 101, 1959, pp. 733–768.
*Siemens-Zeitschrift*, vol. 48, 1974, pp. 69–75.
*Siemens-Zeitschrift*, vol. 50, 1976, pp. 144–147.

*Primary Examiner*—James J. Groody
*Attorney, Agent, or Firm*—Kenyon & Kenyon

[57] ABSTRACT

In a powerline carrier control system, a powerline carrier control transmitter delivers an audio frequency voltage to the powerline carrier control receivers via a coupling unit and AC supply network. The coupling unit consists of a coupling transformer and an L-C combination which would normally insure that the network AC voltage is kept completely away from the powerline carrier control transmitter. In the system disclosed, back voltage is intentionally permitted and a supplementary AC voltage of line frequency is superimposed on the transmitter output voltage to buck the back voltage and thereby prevent current at the line frequency from the AC network from flowing through the transmitter. This simplifies and reduces the cost of the heretofore expensive components of the L-C combination.

6 Claims, 8 Drawing Figures

POWERLINE CARRIER CONTROL SYSTEM WITH POWERLINE CURRENT COMPENSATION

BACKGROUND OF THE INVENTION

1. Field of the Invention

This invention relates to a powerline carrier control system having a powerline carrier control transmitter which generates a keyed AC output voltage at audio frequency. The output voltage is fed, via a coupling unit, into an AC power supply network having an established line frequency.

2. Discussion of the Prior Art

By using a powerline carrier control system, information can be transmitted to a consumer by using a single or multi-phase electric power supply network as the transmission path. Such information may relate, for instance, to initiation of switching operations in the supply network, switching consumers' meters to different rates (e.g., a night rate), or informing a certain group of people (e.g., the fire department).

Such a powerline carrier control system consists, essentially, of a powerline carrier control transmitter, a coupling unit for feeding into the network, and one or more powerline carrier control receivers which are connected to the supply network and control or otherwise inform the consumers. The powerline carrier control transmitter generates an audio-frequency AC output voltage which is keyed in accordance with the information to be transmitted. It is superimposed by means of the coupling unit on the line voltage in the supply network. The powerline carrier control receivers connected to the supply network are selective and decode the transmitted signals and control the consumer connected thereto. The line frequency is usually 50 or 60 Hz, and a frequency of between 150 and 750 Hz is usually used as the audio frequency. The audio frequency is therefore distinctly higher than the line frequency.

A powerline carrier control system of this type is described, for instance, in U.S. Pat. No. 4,021,797. The powerline carrier control system described there uses, as the powerline carrier control transmitter, a static converter, consisting of a line-fed diode rectifier, an intermediate voltage link, and a three-phase pulsed inverter connected thereto which is constructed using power thyristors. The pulsed AC output voltage of the pulsed inverter, the fundamental frequency of which is in the audio range, is fed into the three-phase AC supply network via a coupling unit. The coupling unit used here consists specifically of a series coupling unit, and more specifically, of a combination, designated as a "resonant shunt", of coils and capacitors as well as three coupling transformers connected thereto, which are delta-connected on the primary side and are designed like current transformers. The "resonant shunt" contains three delta-connected capacitors, the junction points of which are each connected, via a choke, to the three output leads of the pulsed inverter. This L-C combination is series resonant at the line frequency; it prevents line-frequency voltages from being coupled back into the powerline carrier control transmitter from the network side. The "resonant shunt" further contains three other delta-connected capacitors, the junction points of which are connected directly to the three output leads of the pulsed inverter. Together with the mentioned L-C combination of the series resonnant circuit, these capacitors form a parallel resonant circuit at the audio frequency.

Another powerline carrier control system of the type mentioned at the outset is described in the journal "Elektizitatswirtschaft", Vol. 70 (1971), No. 9, pages 237 to 241, particularly FIG. 1. There, a converter consisting of a line-fed diode rectifier, intermediate DC voltage circuit, and a line-commutated inverter using thyristors in a three-phase bridge circuit serves as the powerline carrier control transmitter. Here a series coupling unit is also used as the coupling unit, it being stated that the coupling unit can also be designed as a parallel coupling unit. The series coupling unit comprises, for each phase, a first L-C series circuit, a second L-C series circuit and a coupling transformer. In order to keep line-frequency back voltage away from the converter, the AC output voltage of the inverter is fed to the coupling transformer via a series resonant circuit tuned to audio frequency. A second series resonant circuit forms a short circuit for the line frequency directly at the output of the inverter. The main inductance of the coupling transformer is in parallel resonance with the mentioned capacitor for the audio frequency.

A powerline carrier control system using a parallel coupling unit is described in VDI-Zeitschrift, Vol. 101 (1959), pages 733 to 768, especially from FIG. 17, and from "Siemens-Zeitschrift" 48 (1974), pages 69 to 75, particularly FIGS. 2 and 3.

In the known coupling units, special attention must be given to the design and the tuning of the individual components so that no line-frequency back voltage appears on the transmitter side. A line-frequency back voltage would cause equalization or short-circuit currents and would thereby endanger the components of the powerline carrier control transmitter. The chokes and capacitors used as well as the coupling transformers must be of high quality. This applies to powerline carrier control systems using series as well as parallel coupling units. The cost for the coupling unit has, up to now, been considerable. In some of the powerline carrier control systems built so far, the cost of the L-C combination is approximately equal to the cost of the coupling transformers and also approximately equal to the cost of the powerline carrier control transmitter itself.

In German Offenlegungsschrift No. 23 04 734, a powerline carrier control system having a thyristor powerline carrier control transmitter is described which is connected to the power network via transformers alone. One resonant shunt is eliminated entirely by controlling the thyristor inverter so that its output impedance at the frequency of the power network has the value zero. This powerline carrier control system, however, has the drawback that the powerline carrier control transmitter must be designed for the line-frequency current which is coupled via the transformers to the transmitter side. This means that the cost of the powerline carrier control transmitter, e.g. the thyristor inverter, in this case is considerable.

It is an object of the present invention to provide a powerline carrier control system of the kind mentioned at the outset in such a way that its coupling unit (series or parallel coupling unit) is considerably simplified and the cost of such a coupling unit, thereby, is lowered considerably without appreciably increasing the cost of the power section of the powerline carrier control transmitter. This should be possible, particularly in a powerline carrier control system with a parallel coupling unit.

SUMMARY OF THE INVENTION

The basic idea of the invention is to lay out the coupling unit not optimally, but relatively simply, and to compensate the line-frequency back voltage, which, as a result, is not completely suppressed and is coupled to the transmitter output by the coupling transformers, by means of a specially provided supplemental AC voltage. According to this basic idea, a certain amount of line-frequency back voltage is therefore permissible on the transmitter side of the coupling transformer, as seen from the point of view of the design of the coupling unit. This back voltage is to be suppressed by electrical measures, namely, the superposition of the supplementary AC voltage mentioned.

According to the invention, this problem is solved by providing a coupling unit which is not, itself, designed for complete suppression of a line-frequency back voltage, and by superimposing a supplementary AC voltage of line frequency on the AC output voltage of the powerline carrier control transmitter, and controlling its amplitude and its phase, referred to the network AC voltage, to avoid an excessive output current at line frequency caused by the back voltage which would otherwise flow through the powerline carrier control transmitter.

In principle, it is possible to connect an auxiliary transmitter for supplying the supplementary AC voltage in series with the powerline carrier control transmitter. Such an option, however, would make the transmitter more expensive. A preferable embodiment of the invention, on the other hand, combines the powerline carrier control transmitter which supplies the audio-frequency output AC voltage and the auxiliary transmitter for supplying the line-frequency supplementary AC voltage in a common transmitter. The common transmitter is a static inverter having a control unit which is fed a control voltage corresponding to the audio-frequency output AC voltage and on which a supplementary control voltage corresponding to the required supplementary AC voltage is superimposed.

A particularly simple embodiment is obtained if a thyristor inverter which is controlled by the pulse-width modulation method is used as the powerline carrier control transmitter. This embodiment is distinguished by the fact that the pulse pattern of the audio-frequency output AC voltage is modulated with the supplementary AC voltage which can be controlled as to amplitude and phase. The thyristor inverter is then used for generating both AC voltages. The pulse width modulation is carried out so that the line-frequency back voltage, coupled in via the coupling transformer and present at the output of the powerline carrier control transmitter, is cancelled.

In a further advantageous and preferred embodiment in a powerline carrier control transmitter using energy storage (e.g., a battery or a capacitor), power for the keyed audio frequency signals to be supplied by the powerline carrier control transmitter is obtained directly from the AC power network via the coupling unit, using the line-frequency back voltage for the transmitter.

Thereby, the components for the power supply of the powerline carrier control transmitter which have heretofore been required in accordance with the state of the art, can be omitted; these components consist, for instance, of the auxiliary power transformer, isolating switch, fuses, input circuit breaker and diode rectifier with commutating choke. Also eliminated are the wiring of these components and the cable connection to a low-voltage distribution box. There remain only the energy storage circuit, i.e., in the case of an inverter, the preceding DC intermediate circuit with the energy storage device in the form of electrolytic capacitors or a battery, as well as the power supply for the electronic control circuitry.

This embodiment is well suited for a coupling unit using parallel coupling, since the magnitude of the line-frequency back voltage is then constant (proportional to the voltage of the AC network) and can be determined by appropriate design of the coupling components.

In a powerline carrier control transmitter of a generalized type, the supply of the back voltage as the supply voltage can be accomplished in a forced manner through control. Accordingly, provision is made to control the line-frequency supplementary AC voltage at the start of each keying pulse so that a certain amount of line-frequency compensation current flows through the powerline carrier control transmitter, thereby supplying the power required for the keyed audiofrequency pulse to the energy storage device.

When an inverter is used as the powerline carrier control transmitter, the level of the back voltage is chosen so that, when it is rectified by the feedback diodes of the inverter, it supplies the needed voltage level in the intermediate DC circuit for generating the keyed audio-frequency pulses. The inverter, especially if it is pulse-width modulated as described above and so differs from the powerline carrier control transmitter of the general kind, is specifically controlled so that, in addition to generating audio-frequency voltage pulses, the line-frequency back voltage is simultaneously cancelled. Since, as a result, the voltage of the energy storage device in the intermediate DC circuit drops because active audio-frequency power is drawn from the AC network coupling, a current flows automatically from the output of the inverter into the energy storage device due to the no longer fully compensated back voltage, and the storage device is recharged. Thus, the energy used at any time is immediately replenished, via the coupling unit, without further expenditure. The inverter can, in particular, be one having thyristors as the main valves.

The powerline carrier control system of the present invention can be used to special advantage in conjunction with a coupling unit which is described in U.S. patent application Ser. No. 40,477, filed May 18, 1979 and entitled "Powerline Carrier Control System" and corresponding to German application No. P 28 25 249.5. In the coupling unit described there, essentially only the main field inductance of the isolation transformer used for coupling is used as the inductance of the resonant circuit, which together with the capacity of the coupling capacitor, determines the resonance frequency of the resonant circuit.

Particular advantages of the invention reside in simplification of the powerline carrier control system and reduced cost on the transmitter side, insofar as design of the coupling unit is concerned. The overall size of individual components can be reduced considerably. Such simplification can be obtained not only in a powerline carrier control system with a series coupling unit but also in one with a parallel coupling unit. The individual components of the coupling unit can be designed for smaller power and/or quality than heretofore. For instance, the chokes can be designed for less current, the capacitors for lower voltage and/or the resonant circuits for lower Q than heretofore, depending on the requirements and the application. The extent of the simplification depends on how much back voltage is still permissible. In an extreme case, the L-C component for suppressing the line-frequency backward voltage can be omitted completely in a series coupling unit (e.g., Siemens Zeitschrift 1974, pages 69 to 75, FIG. 4), where the resonant component for the audio frequency is also omitted. In some cases, current transformers of particularly simple design can be used as coupling transformers, even without iron core in an extreme case. In view of the advantages mentioned, the additional cost for superimposing the supplementary AC voltage, which must be listed as additional control costs if a pulsed inverter is used, does not carry much weight.

DETAILED DESCRIPTION OF THE INVENTION

Figure 1:
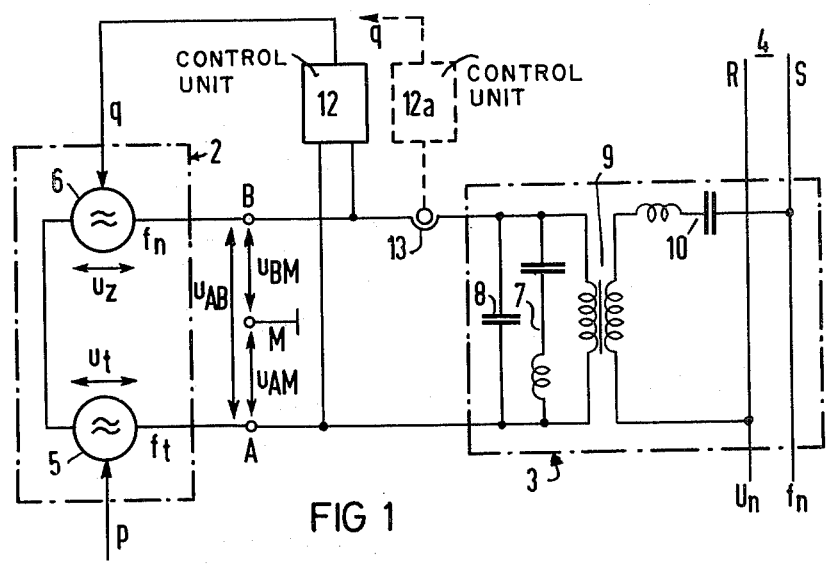
FIG. 1 is a schematic diagram showing the basic, single phase circuit of a powerline carrier control transmitter having a parallel coupling unit, according to the teachings of the invention.

FIG. 1 is an equivalent circuit diagram of a single-phase of the transmitter side of an audio-frequency powerline carrier control system. In it, a transmitter 2 is connected, via a coupling unit 3, to a single-phase power or supply AC network 4 having the phase conductors R, S. Supply network 4 carries a sinusuoidal line AC voltage $U_n$ at a line frequency $f_n$. Line frequency $f_n$ is usually 50 or 60 Hz.

Transmitter 2 of the audio-frequency powerline carrier control system includes a conventional powerline carrier control transmitter 5 which is connected in series with another, auxiliary transmitter 6.

Powerline carrier control transmitter 5 generates an AC output voltage $u_t$ at an audio frequency $f_t$. The AC output voltage $u_t$ can, in particular, be sinusoidal, and the audio frequency $f_t$ can have a value between 150 and 750 Hz. The two frequencies $f_t$ and $f_n$ are therefore distinctly different. Also, the audio frequency is chosen so that it is not equal to 5, 7, 11 or 13 times the line frequency $f_n$, as an AC power supply network usually contains 5th, 7th, 11th and 13th order harmonics in addition to the fundamental. The output AC voltage $u_t$ of transmitter 5 is gated by means of a keying signal p in accordance with the information to be transmitted.

Auxiliary transmitter 6 generates a supplementary AC voltage $u_z$. This supplementary AC voltage $u_z$ is of line frequency $f_n$, i.e., likewise 50 or 60 Hz, depending on transmission line frequency $f_n$. Supplementary AC voltage $u_z$ is likewise, in particular, sinusoidal. It is controlled as to amplitude and phase by means of a control signal q, the phase being controlled with reference to the phase of the line AC voltage $U_n$. The output voltage $u_{AB}$ between the two output terminals A, B of the transmitter 2 is therefore obtained as $u_{AB}(f_t,f_n)=u_t(f_t)+u_z(f_n)$. Between the output terminals A, B there is a reference point M, which is at zero potential or chassis ground.

The two output terminals A, B of transmitter 2 are connected to the AC network 4 through coupling unit 3. Coupling unit 3 is, in this embodiment, a parallel coupling unit of known design. It consists of a series L-C circuit 7, a capacitor 8 connected in shunt therewith, a coupling transformer 9 and an L-C combination 10. L-C combination 10 is resonant at the audio frequency $f_t$. In the present case, the L-C combination 10 consists of a choke and a capacitor connected in series. It is connected in series with the secondary winding of transformer 9, and, in prior art circuits, takes care that line-frequency current is not coupled into powerline carrier control transmitter 5 via coupling transformer 9. The capacitor 8 is shunted across the primary winding of the coupling transformer 9. Together with the L-C combination 7, it forms a resonant circuit which is tuned to the audio frequency $f_t$.

In the illustrative embodiment a parallel coupling unit is shown in FIG. 1 as the coupling unit 3; the measures and considerations described in the following apply equally, however, to a series coupling unit.

Contrary to conventional powerline carrier control systems, the design of coupling unit 3 is substantially simplified, which leads to a considerable cost reduction. Coupling unit 3, especially L-C combination 7, is by choice, not designed optimally for complete suppression of a line-frequency back voltage stemming from AC supply network 4 and coupled in via coupling transformer 9. Rather, such a line-frequency backward voltage is permitted to appear, due to design and layout, between the output terminals A, B. In the present case, this back voltage is cancelled by means of transmitter 2 and, specifically, by means of auxiliary transmitter 6 and its special drive. A particularly expensive L-C series resonant circuit at the output of transmitter 2 is therefore no longer necessary. L and C components of lower power rating also can be used. In some cases, i.e., depending on the degree of coupling of coupling transformer 9 and the magnitude of the permissible back voltage, the L-C combination can be omitted altogether. The same applies also to capacitor 8. Cost and size are thereby reduced considerably.

As can be seen in FIG. 1, the control signal q is generated by a control unit 12. Control unit 12 measures, by means of a filter, not shown, the line-frequency component of the AC output voltage $u_{AB}$, i.e., the back voltage, between the output terminals A, B. It forms the control signal q in such a way that the supplementary AC voltage $u_z$ equals this component to zero. In other words, the supplementary AC voltage $u_z$ is so controlled by control unit 12 that flow of an equalization current through powerline carrier control transmitter 2, is cancelled as completely as possible. Or, expressed differently, the impedance of transmitter 2 is, in effect, practically infinite for the line-frequency back voltage.

The control q can be determined not only by measurement of the back voltage but also by measurement of the interfering equalization current. A circuit for doing this is drawn in FIG. 1 in dashed lines. In it, a control unit 12a is acted upon by a signal derived from the equalization current by means of a current transformer 13 and reduces the equalization current flow to zero. Control unit 12a, thus, also delivers the already defined control signal q.

In the voltage-time diagram of FIGS. 2–5, the superposition of the audio-frequency output AC voltage $u_t(f_t)$ and the line frequency supplementary AC signal $u_z(f_n)$ are shown for the case in which these two AC voltages are jointly furnished by a pulsed inverter. The meaning of the individual voltages $u_{AM}$, $u_{BM}$, $u_{AB}$ is evident from FIG. 1.

Figure 2:
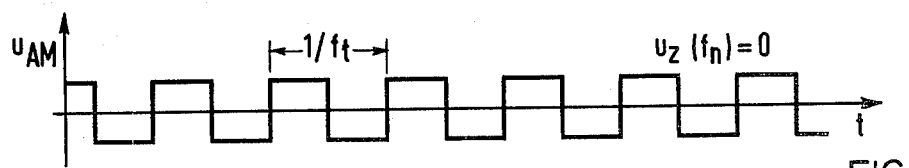
FIGS. 2 to 5 are voltage-time diagrams showing the the output and the supplementary AC voltages generated at the same time by a transmitter using a pulsed inverter.

In FIG. 2, the output AC voltage $u_{AM}$ of transmitter 2 is shown for the case in which no supplementary voltage is being furnished. Therefore, $u_z(f_n)=0$. The output AC voltage $u_{AM}$ is measured here between output terminal A and reference point M. The base for the waveform of the output AC voltage $u_{AM}$ is a pulse pattern keyed at audio frequency $f_t$; the positive and negative voltage-time areas are equal.

Figure 3:
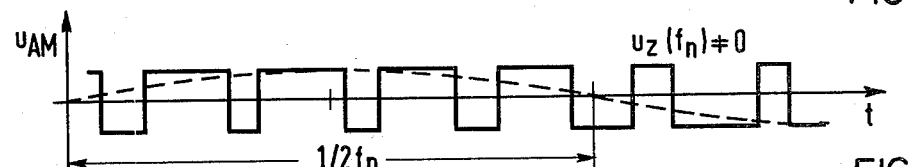

FIG. 3 is the output AC voltage $u_{AM}$ when a supplementary AC voltage $u_z(f_n) \neq 0$ at line frequency $f_n$ is modulated on the pulse pattern. Amplitude and phase of the supplementary AC voltage $u_z(f_n)$ are equal to the line frequency back voltage, not shown. Comparison with FIG. 2, shows that a shift of the individual zero crossings results. The fundamental sine wave of the superposed supplemental AC voltage, $u_z(f_n)$ modulated thereon, is shown by the dashed line.

Figure 4:
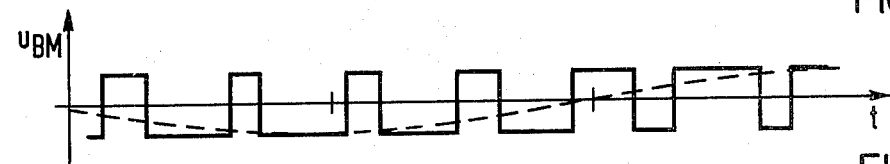
Figure 5:
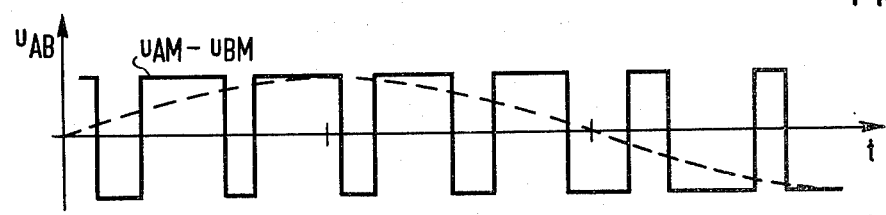

In FIG. 4, the corresponding output AC voltage $u_{BM}$ between output terminal B and reference point M is shown. Here, too, the sinusoidal fundamental modulated thereon is shown dashed. In FIG. 5, the output AC voltage $u_{AB}$ between the two output terminals A, B is shown. The waveshape results from the difference of the output AC voltages $u_{AM}$ and $u_{BM}$. The line-frequency fundamental is again shown dashed.

Figure 6:
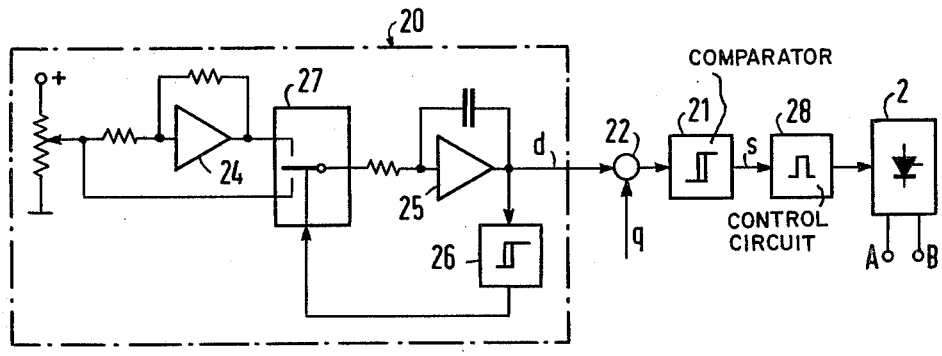
FIG. 6 is a circuit diagram of an arrangement for driving such a pulsed inverter.

FIG. 6 illustrates an embodiment of a circuit arrangement for driving a pulsed inverter to act simultaneously as the powerline carrier control transmitter 5 and the auxiliary transmitter 6, i.e., as the common transmitter 2. The circuit arrangement comprises a triangle-voltage generator 20, the output of which is connected to a comparator 21 via comparison input 22. Comparator 21, which has a hysteresis characteristic curve, supplies output signals which act on the control circuit 28 of pulsed inverter 2.

Figure 7:
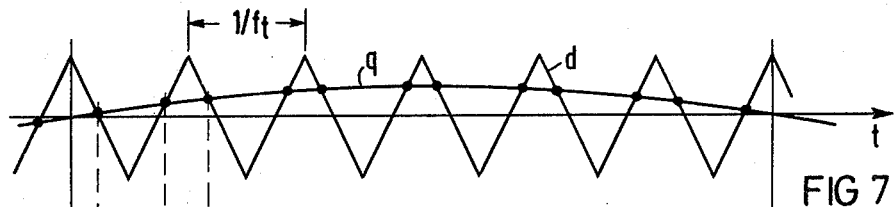
FIGS. 7 and 8 are voltage-time diagrams at key points in FIG. 6.

Triangle-voltage generator 20 may be of the kind described in Canadian Pat. No. 10 37 557, particularly FIG. 5. It consists of an operational amplifier connected as an inverting amplifier 24, an operational amplifier connected as an integrator 25, a comparator 26 and a double-throw switch 27, which can be realized as a field effect transistor. The output of triangle-voltage generator 20 is a triangular voltage d which has the frequency and phase of the desired output AC voltage $u_t$. The latter is shown in FIG. 7 as sawtooth wave.

Figure 8:
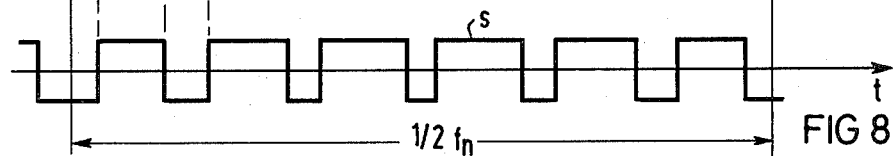

At the input 22 of comparator 21, the triangular voltage d is compared with the control signal q, which is proportional to the line-frequency component of the output voltage $u_{AB}$. The control signal q is shown in FIG. 7 as a sine curve. The supplementary AC voltage $u_z$ generated for the cancellation of the line frequency component is equal, as to frequency and phase, and proportional, as to amplitude, to the control signal q. At every intersection of the two curves d and q, a switching flank is generated in the output signal of comparator 21 which serves as the drive signal s for the control circuit 28 which in turn, drives the pulsed inverter of transmitter 2. The drive signal s is shown in FIG. 8. The pulsed inverter thus generates the desired output AC voltages $u_{AM}$ and $u_{BM}$, respectively, of FIGS. 3 and 4.

What is claimed is:

1. A powerline carrier control system comprising a powerline carrier control transmitter for generating a keyed output voltage at audio frequency to be supplied to an AC powerline that has a predetermined line-frequency, and coupling means comprising a first side connected to said transmitter and a second side connected to said powerline to transfer said keyed output voltage to said powerline, said system comprising:
   a. control signal generating means to generate a control signal at said line-frequency, said control signal corresponding to a back AC signal at said line-frequency transmitted from said powerline through said coupling means; and
   b. superimposing means connected to said control signal generating means to be controlled by said control signal, said superimposing means being connected to said powerline carrier control transmitter to superimpose, on said keyed output voltage at audio frequency therefrom, a compensating voltage at a controlled amplitude and phase relative to said back signal and in opposition thereto to reduce substantially the flow of current at said predetermined line-frequency from said powerline through said powerline carrier control transmitter.

2. A powerline carrier control system in accordance with claim 1 in which the powerline carrier control transmitter is a static inverter, and said control signal generating means is connected across said first side of said coupling means to receive said back AC signal in the form of a back AC voltage.

3. A powerline carrier control system in accordance with claim 1 in which said powerline carrier control transmitter is a static inverter, and said control signal generating means comprises current pickup means connected in series with said powerline carrier control transmitter and said first side of said coupling means to derive said back AC signal in the form of a back AC current.

4. A powerline carrier control system in accordance with claim 1 in which said transmitter comprises means to generate a pulse voltage wave, and said superimposing means comprises means to modulate the width of the pulses forming said pulse wave, the width-modulating signal comprising said compensating voltage.

5. A powerline carrier control system in accordance with claim 1 in which said transmitter comprises:
   a. a thyristor inverter;
   b. a control unit connected to said inverter to turn said inverter on and off;
   c. a comparator circuit having first and second input circuits; and
   d. means to generate a triangular voltage wave having a repetition rate substantially different from said line-frequency and connected to one of said input circuits of said comparator, the other of said input circuits of said comparator being connected to said control signal generating means, said comparator producing an output impulse each time the control signal applied to said second input terminal of said comparator is equal to the voltage of said triangular signal, said control unit reversing the state of conductivity of said inverter at the occurrence of each of said output impulses of said comparator.

6. A powerline carrier control system in accordance with claim 1 in which said powerline carrier control transmitter is provided with an energy storage device, said line frequency back AC signal serving as the supply voltage for the powerline carrier control transmitter.

\* \* \* \* \*